United States Patent Office 3,025,305
Patented Mar. 13, 1962

---

3,025,305
CYCLIC CARBONATE FROM OLEFIN
Joseph A. Verdol, Dolton, Ill., assignor to Sinclair Refining Company, New York, N.Y., a corporation of Maine
No Drawing. Filed Apr. 21, 1959, Ser. No. 807,764
7 Claims. (Cl. 260—340.2)

This invention is a process whereby olefins are converted to cyclic carbonate esters resembling cyclic esters of vicinal glycols by direct oxidation of the olefins in the liquid phase with gaseous mixtures of carbon dioxide and a molecular oxygen-containing gas. Cyclic alkylene carbonate esters are useful as solvents for polymers and for selective extraction procedures. They are also intermediates for preparing epoxides, glycols, ethanolamines, polyesters and other glycol esters. Because of the ability of cyclic alkylene carbonates to react with the evolution of carbon dioxide, they may also find use as blowing agents for preparing foamed plastic or elastomeric compositions.

Cyclic alkylene carbonate esters are conventionally made by reacting vicinal glycols, that is, glycols wherein the hydroxy groups are on adjacent carbon atoms, with diethyl carbonate in the presence of an ester interchange catalyst or by the direct reaction of an epoxide with carbon dioxide. See, for example Italian Patent 499,185. By means of this invention cyclic alkylene carbonate esters are formed by the direct oxidation of olefins in the liquid phase with a carbon dioxide and oxygen mixture.

The process of this invention uses a dual catalyst system to effect the formation of the carbonate ester by direct oxidation of olefins. The system will be referred to herein as a combination of catalyst A and catalyst B. Catalyst A is a heavy metal oxidation catalyst. It is a salt, or other compound, organic or inorganic of a catalytic heavy metal. The metal is frequently chosen from the transition metals of atomic number 23 to 29, but compounds of other metals, such as tungstate and plumbate salts are useful. The metals of atomic number from 23 to 29 include vanadium, chromium, manganese, iron, cobalt, nickel and copper. Salts of the transition or "group VIII" metals, such as iron, cobalt and nickel, are preferred for use in this process but copper and/or vanadium compounds are sometimes used, usually as a salt. Of the inorganic salts, the halides of these metals have proven to be effective, but the organic salts, especially the naphthenates, are preferred from a solubility standpoint. An insoluble catalyst such as a cobalt oxide-molybdenum oxide catalyst may be used where the reaction mixture is sufficiently agitated to maintain suspension in the liquid phase reaction. A catalytic amount—usually between about 0.1 to 2% of the weight of the reactant—of the heavy metal compound is used.

Catalyst B is the halide or hydroxy form of an ammonium compound, e.g., of the type $R_4NX$ where X is OH or halogen and R is hydrogen or a monovalent organic radical, e.g. a substituted or unsubstituted hydrocarbon of up to 12 carbon atoms, or a mixture of the same. Preferably, the compound is quaternary, R is a lower alkyl, that is, an alkyl of 1-5 carbon atoms, and X is bromine, but ammonium hydroxide or ammonium bromide are operable in the process. The catalytic amount of catalyst B used in the process is generally between about 0.1 to 5% of the total weight of the reaction mass, preferably about 0.5 to 2%. The catalytic amounts of catalysts A and B are preferably mixed with each other before the catalyst is added to the reactants, but they may be added separately to the reactants before reaction conditions are established.

The process of this invention is operable to convert to cyclic carbonates, olefins of at least two carbon atoms.

The olefin will usually not contain more than about 30 carbon atoms. The preferred olefins are the monoolefins of 2-18 carbon atoms, whether aliphatic, cycloaliphatic, straight or branched chain. The olefins may also be substituted with, for instance, halogen or nitro substituents and may contain aryl or other groups which do not prevent the desired reaction. The reaction to obtain the carbonates consumes approximately one mole of carbon dioxide and one-half mole of oxygen for each mole of olefin converted. The oxygen may be supplied by any convenient source of molecular oxygen, for example, pure oxygen, air, or oxygen-enriched air, and other inert gases than nitrogen for example, helium, may be present. The oxygen may or may not be present in excess at the start of the reaction, or the oxygen may be introduced to the reactants as necessary. A gas mixture containing equimolar amounts of oxygen and carbon dioxide may conveniently be used.

The reaction is conducted in the liquid phase, therefore it is often desirable to employ an inert solvent when conducting it, especially when the olefins being oxidized are above their crtical temperatures. For example, a solvent would probably be required when oxidizing all olefins up to about six carbon atoms. For the higher olefins it may not be necessary to employ a solvent. Benzene or another inert hydrocarbon is especially suitable for this purpose; alkyl substituted aromatics and paraffins are oxidized under the conditions of the process, whereas benzene is not attacked.

The general temperature range for conducting this reaction is about 200° F. to 400° F. with the preferred temperature range being about 250° F. to 350° F. The pressure may vary between just enough pressure to maintain the liquid phase up to, for example, about 2500 or 5000 p.s.i.g. The examples given below were conducted by pressuring a reaction mixture of olefin, solvent, and catalyst at reaction temperature to about 500 p.s.i.g. with carbon dioxide and then employing a mixture of carbon dioxide and oxygen to obtain a maximum pressure of about 900 p.s.i.g. Actually, it is more convenient to pressure the reaction mixture (at reaction temperature) with carbon dioxide up to a pressure of about 900–2000 p.s.i.g., and then introduce pure oxygen slowly until the desired degree of reaction is attained. During the reaction a partial pressure of $CO_2$ of at least about 500 p.s.i.g. is maintained. The reaction is as follows:

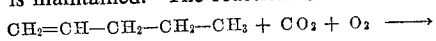

1-pentene

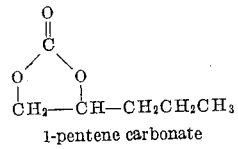

1-pentene carbonate

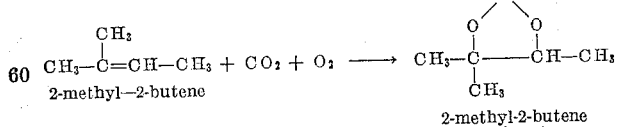

2-methyl-2-butene carbonate

The following examples of the process of this invention are to be considered as illustrative only and not limiting.

*Example I*

A mixture of 430 parts of 1-pentene and 430 parts of benzene was charged to a 2-liter stirred autoclave. A mixture of 8 parts cobalt naphthenate and 5 parts tetraethylammonium bromide were also charged to the autoclave. The mixture was heated to 260° F. with continuous stirring and was pressured to 500 p.s.i.g. with carbon dioxide. A mixture of carbon dioxide and oxygen (50:50 mole percent) was introduced slowly into the mixture until a pressure of 900 p.s.i.g. at 300° F. was attained. The addition of the carbon dioxide-oxygen mixture was made over a period of about three hours. The amount of oxygen introduced was sufficient to oxidize about 15 percent of the 1-pentene. The reaction mixture was heated an additional 2 hours at 300° F. without any further addition of carbon dioxide or oxygen.

The reaction mixture was removed after depressurizing and cooling the autoclave. After filtering the crude reaction mixture it was distilled to afford unreacted 1-pentene, benzene, some lower molecular weight oxidation products and about 20 parts of 1-pentene carbonate B.P. 80° C. (0.5 mm.), $n_D^{25}$ 1.4332. The infrared spectrum of this materail was found to be identical with the spectrum of a sample of 1-pentene carbonate prepared from the ester interchange reaction of 1,2-pentanediol and diethyl carbonate. The properties obtained for the 1-pentene carbonate prepared by the ester interchange method were B.P. 80° C. (0.5 mm.), $n_D^{25}$ 1.4304. Similar results are afforded by substituting tetraethyl ammonium hydroxide or ammonium bromide for the tetraethyl ammonium bromide.

It was found in general that the five membered cyclic alkylene carbonate esters all exhibited a characteristic absorption in the infrared region at 5.57 microns. In contrast to this, most non-cyclic esters show absorption at 5.76 microns. Therefore, the five-membered cyclic carbonate ester could be easily distinguished from other esters by the characteristic infrared spectrum.

*Example II*

131 parts of 2-methyl-2-butene and 177 parts of benzene were mixed with 2 parts of cobalt naphthenate and 5 parts of tetraethylammonium bromide. The entire mixture was charged to a 1-liter stirred autoclave and heated to about 240° F. and carbon dioxide introduced into the mixture until a pressure of about 400 p.s.i.g. was attained. A 50:50 mole percent mixture of carbon dioxide and oxygen was then introduced into the reaction vessel at a very slow rate until a maximum pressure of 870 p.s.i.g. at 300° F. was attained. The entire process required about three hours. After cooling and depressurizing the bomb the product was distilled to remove the unreacted olefin, benzene and lower molecular weight oxidation products. Examination of the higher boiling products (30 parts) showed that the carbonate ester was present. The characteristic infrared absorption at 5.57 microns was displayed when the product was examined by infrared.

I claim:

1. A process for the production of a cyclic carbonate which comprises reacting a monoolefin of 2 to about 30 carbon atoms with carbon dioxide having a partial pressure of at least about 500 p.s.i.g. and a molecular oxygen-containing gas at a temperature of about 200° to 400° F. and a total pressure sufficient to maintain the liquid phase, in the presence of two catalysts, the first of which is a cobalt organic salt oxidation catalyst and the second of which is a quaternary ammonium compound of the type $R_4NX$ where R is selected from the group consisting of hydrogen and alkyl radicals of 1–5 carbon atoms and X is selected from the group consisting of hydroxide and bromine.

2. The process of claim 1 where the temperature is about 250° to 350° F.

3. A process for the production of a cyclic carbonate which comprises reacting a monoolefin of 2 to about 30 carbon atoms with carbon dioxide having a partial pressure of at least about 500 p.s.i.g. and a molecular oxygen-containing gas at a temperature of about 200 to 400° F. and a total pressure sufficient to maintain the liquid phase in the presence of catalytic amounts of cobalt naphthenate and tetraethyl ammonium bromide.

4. The process of claim 3 in which the temperature is about 250° to 350° F.

5. The process of claim 1 where the second catalyst is a tetra-alkyl ammonium bromide.

6. The process of claim 5 where the bromide is tetraethyl ammonium bromide.

7. The process of claim 1 where the olefin is of 2 to 18 carbon atoms.

References Cited in the file of this patent

UNITED STATES PATENTS

| | | |
|---|---|---|
| 1,998,878 | Lefort | Apr. 23, 1935 |
| 2,477,435 | Aries | July 26, 1949 |
| 2,491,057 | Nevison et al. | Dec. 13, 1949 |
| 2,773,070 | Lichtenwalter et al. | Dec. 4, 1956 |
| 2,773,881 | Dunn | Dec. 11, 1956 |
| 2,873,282 | McClellan | Feb. 10, 1959 |